(12) United States Patent
Otani et al.

(10) Patent No.: US 12,434,512 B2
(45) Date of Patent: Oct. 7, 2025

(54) MOTORCYCLE TIRE SET

(71) Applicant: SUMITOMO RUBBER INDUSTRIES, LTD., Hyogo (JP)

(72) Inventors: Masafumi Otani, Hyogo (JP); Ryota Sato, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 20 days.

(21) Appl. No.: 18/398,415

(22) Filed: Dec. 28, 2023

(65) Prior Publication Data

US 2024/0246365 A1 Jul. 25, 2024

(30) Foreign Application Priority Data

Jan. 25, 2023 (JP) ................. 2023-009622

(51) Int. Cl.
 *B60C 11/13* (2006.01)
 *B60C 11/03* (2006.01)
 *B60C 19/00* (2006.01)

(52) U.S. Cl.
 CPC ...... *B60C 11/1392* (2013.01); *B60C 11/0302* (2013.01); *B60C 11/032* (2013.01); *B60C 11/1323* (2013.01); *B60C 19/001* (2013.01); *B60C 2011/0374* (2013.01); *B60C 2011/0376* (2013.01); *B60C 2011/0381* (2013.01); *B60C 2200/10* (2013.01)

(58) Field of Classification Search
 CPC .............. B60C 19/001; B60C 2200/10; B60C 11/0332; B60C 11/0302
 See application file for complete search history.

(56) References Cited

U.S. PATENT DOCUMENTS

| 11,554,612 | B2 | 1/2023 | Hikita | |
|---|---|---|---|---|
| 11,560,018 | B2 | 1/2023 | Hikita | |
| 2020/0282775 | A1* | 9/2020 | Hikita | B60C 11/0302 |
| 2022/0234392 | A1* | 7/2022 | Ichiryu | B60C 11/12 |

FOREIGN PATENT DOCUMENTS

| JP | 2009012543 | A | * | 1/2009 | | |
|---|---|---|---|---|---|---|
| JP | 4989753 | B2 | * | 8/2012 | ......... | B60C 11/0302 |
| JP | 2020-142587 | | | 9/2020 | | |
| JP | 2022-161694 | | | 10/2022 | | |
| JP | 2022-161695 | | | 10/2022 | | |
| JP | 2022161694 | A | * | 10/2022 | ............. | B60C 11/03 |

* cited by examiner

*Primary Examiner* — Blaine Copenheaver
*Assistant Examiner* — Thomas Frank Schneider
(74) *Attorney, Agent, or Firm* — Greenblum & Bernstein, P.L.C.

(57) ABSTRACT

A motorcycle tire set includes a front wheel tire and a rear wheel tire each provided with a plurality of inclined grooves. Each inclined groove includes a first portion extending in a crown region, a second portion extending in a shoulder region, and a third portion connecting the first portion and the second portion. Each third portion includes a first groove edge located on a leading edge side in a tire rotation direction, and a second groove edge located on a trailing edge side in the tire rotation direction. The first groove edge of the front wheel tire is provided with a chamfered portion, and the second groove edge of the rear wheel tire is provided with a chamfered portion.

17 Claims, 11 Drawing Sheets

MOTORCYCLE TIRE SET

BACKGROUND OF THE INVENTION

Field of the Invention

The present invention relates to a motorcycle tire set.

Background Art

Japanese Laid-Open Patent Publication No. 2020-142587 describes a tire for a motorcycle in which a plurality of inclined grooves are provided on a tread portion so as to be inclined with respect to the tire circumferential direction. Each of the inclined grooves includes a first portion on a crown region side, a second portion on a shoulder region side, and a third portion connecting the first portion and the second portion. The third portion has a smaller groove width than the first portion and the second portion.

In general, due to a driving force or a braking force by running, wear is likely to occur at one of a pair of groove edges of the inclined groove. In particular, the groove edges of a groove having a small groove width have a problem that this wear is easily noticeable.

The present invention has been made in view of the above circumstances, and a main object of the present invention is to provide a motorcycle tire set that can have improved appearance by making wear less noticeable.

SUMMARY OF THE INVENTION

The present invention is directed to a motorcycle tire set including a front wheel tire and a rear wheel tire, wherein: each of the front wheel tire and the rear wheel tire includes a tread portion having a designated tire rotation direction; each of the tread portions of the front wheel tire and the rear wheel tire has a plurality of inclined grooves provided so as to be inclined with respect to a tire circumferential direction; each of the plurality of inclined grooves includes a first portion extending in a crown region, a second portion extending in a shoulder region, and a third portion connecting the first portion and the second portion; the third portion has a smaller groove width than the first portion and the second portion; the first portion, the second portion, and the third portion are inclined in the same direction with respect to the tire circumferential direction; the third portion includes a pair of groove edges; the pair of groove edges include a first groove edge located on a leading edge side in the tire rotation direction, and a second groove edge located on a trailing edge side in the tire rotation direction; the first groove edge of the front wheel tire is provided with a chamfered portion; and the second groove edge of the rear wheel tire is provided with a chamfered portion.

As a result of adopting the above configuration, the motorcycle tire set according to the present invention can have improved appearance by making wear less noticeable.

DETAILED DESCRIPTION

Hereinafter, one embodiment of the present invention will be described with reference to the drawings. The drawings contain exaggerated expressions and expressions that differ from the dimensional ratio of the actual structure in order to help the understanding of the present invention. In addition, when there are a plurality of embodiments, the same or common elements are denoted by the same reference characters throughout the description, and the redundant description thereof is omitted.

Figure 1:
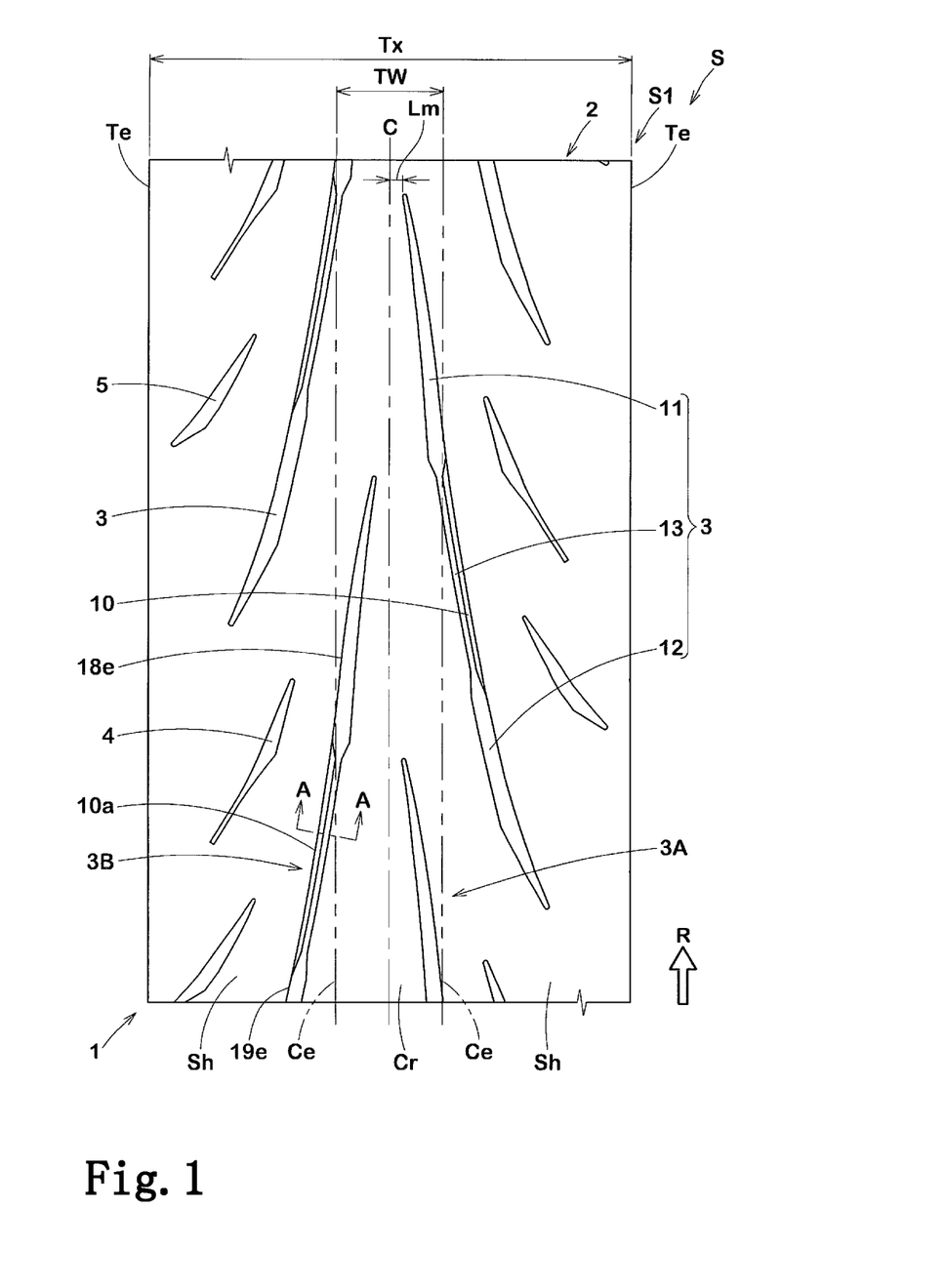
FIG. 1 is a plan view of a tread portion of a front wheel tire according to one embodiment of the present invention.
Figure 2:
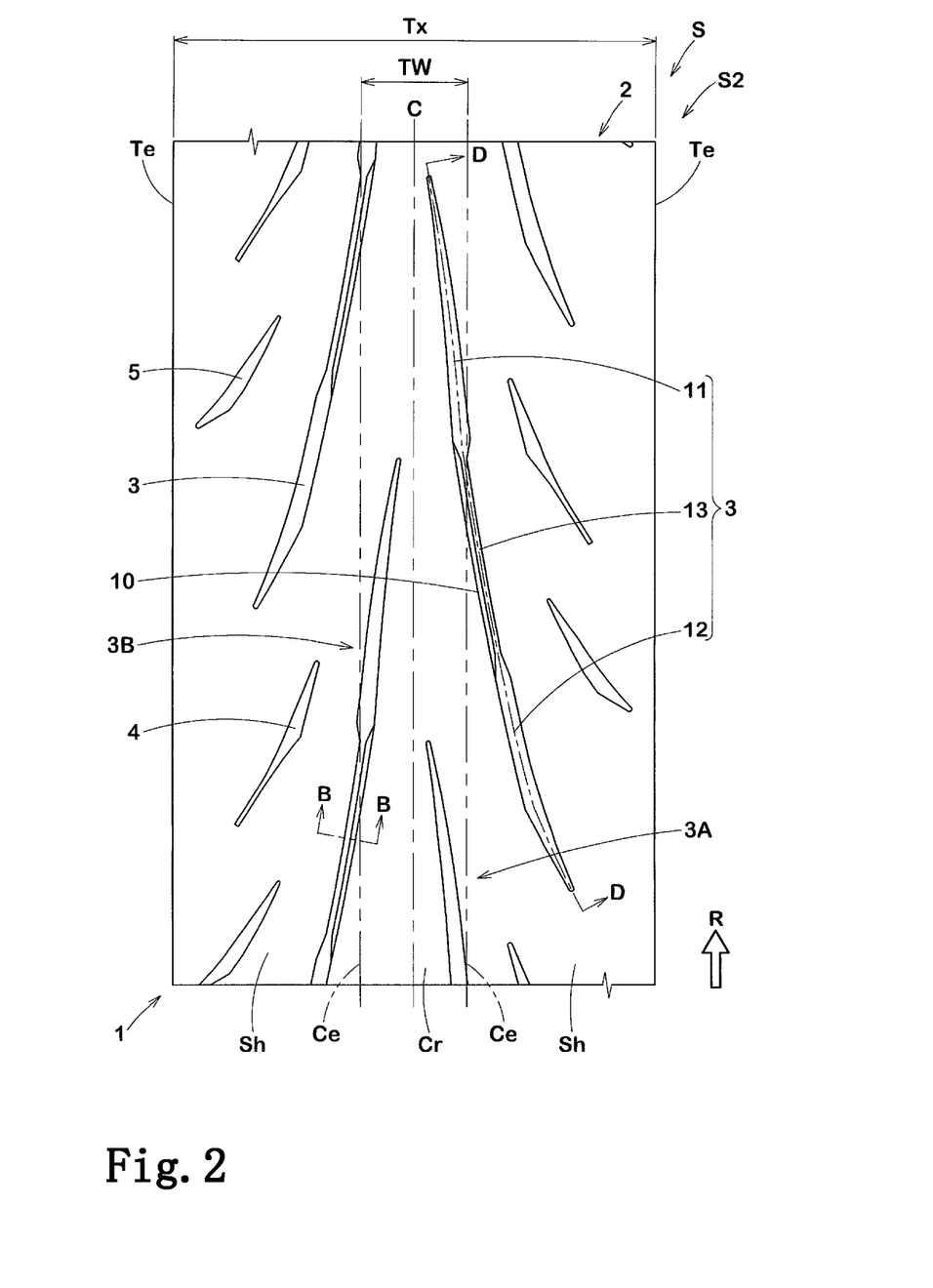
FIG. 2 is a plan view of a tread portion of a rear wheel tire according to the one embodiment of the present invention.

FIG. 1 is a plan view in which a tread portion 2 of a front wheel tire S1 of a motorcycle tire set (hereinafter, simply referred to as "tire set") S according to the present embodiment is developed in a flat surface. FIG. 2 is a plan view in which a tread portion 2 of a rear wheel tire S2 of the tire set S according to the present embodiment is developed in a flat surface. The tire set S is composed of the front wheel tire S1 and the rear wheel tire S2. In the present specification, each of the tires S1 and S2 is sometimes referred to as tire 1.

In the present specification, unless otherwise specified, dimensions and the like of components of the tire 1 are values measured in a standardized state. The "standardized state" is a state where the tire 1 is fitted on a standardized rim (not shown) and inflated to a standardized internal pressure and no load is applied to the tire 1.

The "standardized rim" is a rim that is defined, in a standard system including a standard on which the tire 1 is based, by the standard for each tire, and is, for example, the "standard rim" in the JATMA standard, the "Design Rim" in the TRA standard, or the "Measuring Rim" in the ETRTO standard.

The "standardized internal pressure" is an air pressure that is defined, in a standard system including a standard on which the tire 1 is based, by the standard for each tire, and is the "maximum air pressure" in the JATMA standard, the maximum value indicated in the table "TIRE LOAD LIMITS AT VARIOUS COLD INFLATION PRESSURES" in the TRA standard, or the "INFLATION PRESSURE" in the ETRTO standard.

As shown in FIG. 1 and FIG. 2, each of the front wheel tire S1 and the rear wheel tire S2 includes a tread portion 2 having a designated tire rotation direction R. In the present embodiment, the tread portions 2 of the front wheel tire S1 and the rear wheel tire S2 come into contact with the ground from the upper side toward the lower side in the respective drawings based on the tire rotation direction R.

Each of the tread portions 2 of the front wheel tire S1 and the rear wheel tire S2 has a plurality of inclined grooves 3 provided so as to be inclined with respect to the tire circumferential direction. Each of the plurality of inclined grooves 3 includes a first portion 11 extending in a crown region Cr, a second portion 12 extending in a shoulder region Sh, and a third portion 13 connecting the first portion 11 and the second portion 12.

The third portion 13 has a smaller groove width We (shown in FIG. 3B) than the first portion 11 and the second portion 12. Such a third portion 13 suppresses a decrease in the stiffness of a middle portion 3c in the longitudinal direction of the inclined groove 3 in which relatively large deformation is likely to occur. The third portion 13 also suppresses slipping of the first portion 11 and the second portion 12 mainly in the tire circumferential direction during contact with the ground. Accordingly, occurrence of uneven wear is suppressed.

The first portion 11, the second portion 12, and the third portion 13 are inclined in the same direction with respect to the tire circumferential direction. Such an inclined groove 3 reduces a change in tread stiffness to suppress occurrence of uneven wear and suppress deterioration of appearance due to uneven wear.

Figure 3A:
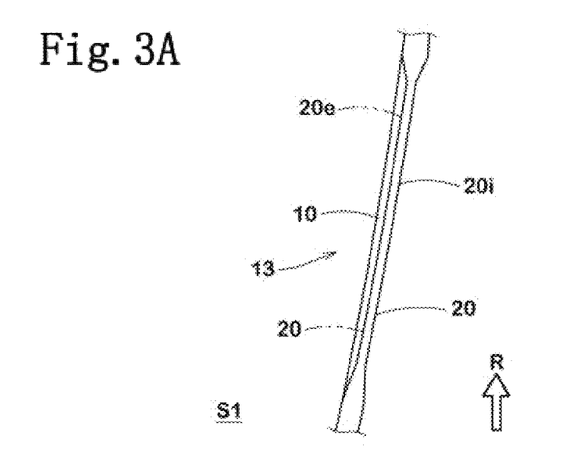
FIG. 3A is an enlarged view of a third portion in FIG. 1.
Figure 3B:
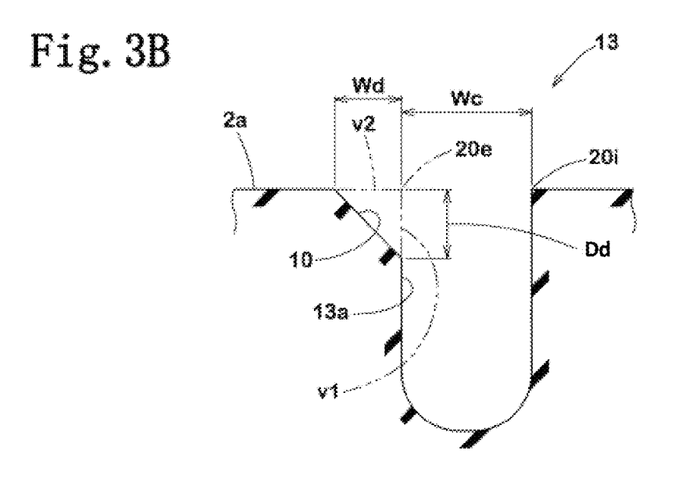
FIG. 3B is a cross-sectional view taken along a line A-A in FIG. 1.
Figure 4A:
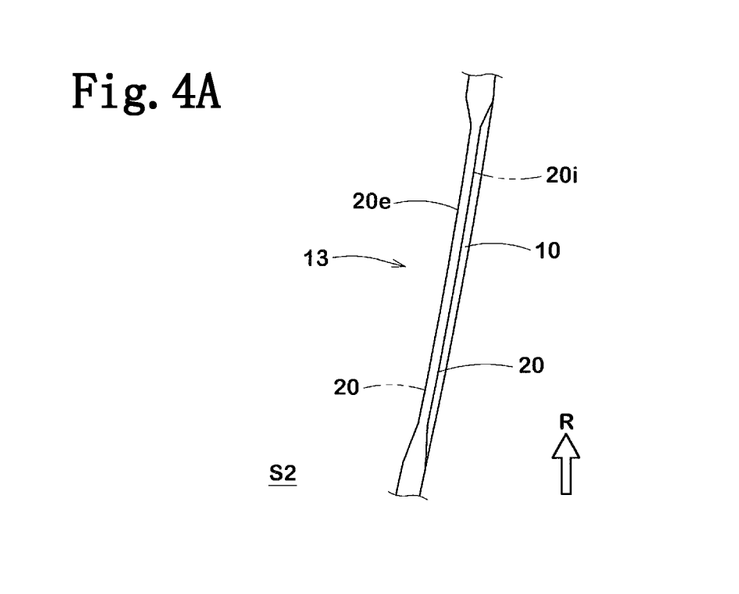
FIG. 4A is an enlarged view of a third portion in FIG. 2.
Figure 4B:
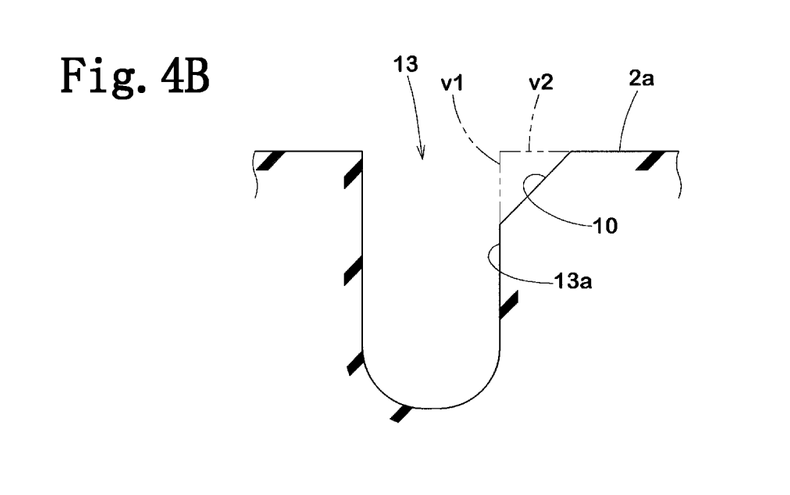
FIG. 4B is a cross-sectional view taken along a line B-B in FIG. 2.

FIG. 3A is an enlarged view of a third portion 13 in FIG. 1, and is a plan view of a third portion 13 of the front wheel tire S1. FIG. 3B is a cross-sectional view taken along a line A-A in FIG. 1. FIG. 4A is an enlarged view of a third portion 13 in FIG. 2, and is a plan view of a third portion 13 of the rear wheel tire S2. FIG. 4B is a cross-sectional view taken along a line B-B in FIG. 2. As shown in FIG. 3 and FIG. 4, each third portion 13 includes a pair of groove edges 20. The pair of groove edges 20 include a first groove edge 20e located on the leading edge side in the tire rotation direction R, and a second groove edge 20i located on the trailing edge side in the tire rotation direction R. The first groove edge 20e of the present embodiment is located on the outer side in the tire axial direction with respect to the second groove edge 20i.

In the tire set S, the front wheel tire S1 is mainly affected by a braking force, so that wear is likely to occur at each groove edge on the trailing edge side in the tire rotation direction R. In addition, the rear wheel tire S2 is mainly affected by a driving force, so that wear is likely to occur at each groove edge on the leading edge side in the tire rotation direction R. In the present invention, the first groove edge 20e of the front wheel tire S1 is provided with a chamfered portion 10. In addition, the second groove edge 20i on the trailing edge side of the rear wheel tire S2 is provided with a chamfered portion 10. Accordingly, even when more wear occurs at the second groove edge 20i in the front wheel tire S1, the appearance of the first groove edge 20e which is provided with the chamfered portion 10 and the appearance of the second groove edge 20i at which the wear has occurred become similar to each other, so that the uneven wear of the third portion 13 is made less noticeable in appearance. Even when more wear occurs at the first groove edge 20e in the rear wheel tire S2, the appearance of the second groove edge 20i which is provided with the chamfered portion 10 and the appearance of the first groove edge 20e at which the wear has occurred become similar to each other, so that the uneven wear of the third portion 13 is made less noticeable in appearance. Therefore, the tire set S according to the present invention makes uneven wear less noticeable and can have improved appearance.

In the case where the first groove edge 20e or the second groove edge 20i is provided with a chamfered portion 10, each groove edge 20e or 20i is specified by the point of intersection of a first virtual line v1 and a second virtual line v2. The first virtual line v1 is a line obtained by smoothly extending a groove wall 13a of the third portion 13 to the outer side in the tire radial direction. The second virtual line v2 is a line obtained by smoothly extending a tread surface 2a to the groove width center line side. The groove width We of the third portion 13 is the shortest distance between the first groove edge 20e and the second groove edge 20i.

In the front wheel tire S1 and the rear wheel tire S2, a width Wd of the chamfered portion 10 is preferably not less than 40% and further preferably not less than 45% of the groove width We of the third portion 13, and is preferably not greater than 90% and further preferably not greater than 85% of the groove width We of the third portion 13. A length Dd in the tire radial direction of the chamfered portion 10 is preferably not less than 10% and further preferably not less than 15% of a groove depth Dc (shown in FIG. 7) of the third portion 13, and is preferably not greater than 35% and further preferably not greater than 30% of the groove depth Dc of the third portion 13.

As shown in FIG. 1 and FIG. 2, in the present specification, the crown region Cr is a region that comes into contact with a flat surface when the tire 1 in the standardized state is brought into contact with the flat surface with the standardized load at a camber angle of 0 degrees. The length in the tire axial direction between both ends Ce in the tire axial direction of the crown region Cr is defined as a tread ground-contact width TW. In addition, each shoulder region Sh is a region between the crown region Cr and a tread end Te. Each shoulder region Sh is a region that comes into contact with the ground when a camber angle is given to the tire 1.

The tread ends Te correspond to both ends in the tire axial direction of the tread portion 2, and are, for example, ends that can come into contact with the ground during cornering around a maximum camber angle. In the present specification, the distance in the tire axial direction between the tread ends Te when the tread portion 2 is developed in a flat surface is defined as a tread development width Tx. A tire equator C is the midpoint between the tread ends Te.

The "standardized load" is a load that is defined, in a standard system including a standard on which the tire 1 is based, by the standard for each tire, and is the "maximum load capacity" in the JATMA standard, the maximum value indicated in the table "TIRE LOAD LIMITS AT VARIOUS COLD INFLATION PRESSURES" in the TRA standard, or the "LOAD CAPACITY" in the ETRTO standard.

In the tire 1, the inclined grooves 3 include, for example, first inclined grooves 3A arranged between the tire equator C and one tread end (right side in the drawing) Te, and second inclined grooves 3B arranged between the tire equator C and the other tread end Te. In the present embodiment, the first inclined grooves 3A and the second inclined grooves 3B are alternately arranged in the tire circumferential direction. The first inclined grooves 3A and the second inclined grooves 3B have a line symmetrical shape with respect to the tire equator C, for example.

Each inclined groove 3 extends without crossing the tire equator C. Such an inclined groove 3 serves to suppress a decrease in the tread stiffness on the tire equator C to which a large ground-contact pressure is applied, and to suppress occurrence of uneven wear. In order to suppress occurrence of uneven wear and maintain the basic performance of the tire 1, a shortest distance Lm (shown in FIG. 1) between the inclined groove 3 and the tire equator C is preferably not greater than 10% and further preferably not greater than 8% of the tread ground-contact width TW.

Figure 5:
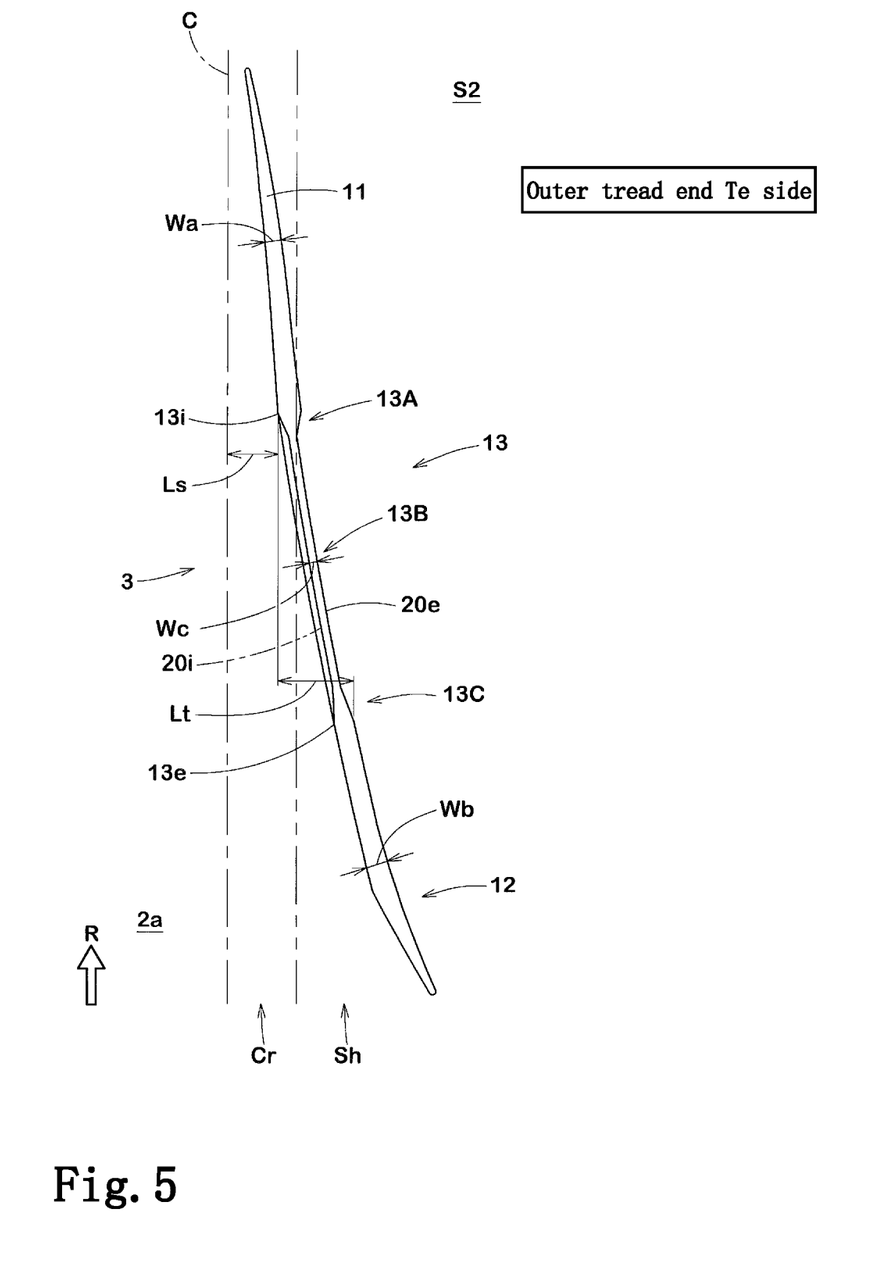
FIG. 5 is a plan view of an inclined groove of the rear wheel tire.

FIG. 5 is a plan view of an inclined groove 3 of the rear wheel tire S2. As represented in FIG. 5, in the rear wheel tire S2 and the front wheel tire S1, the third portion 13 includes an inner end 13*i* connected to the first portion 11 and an outer end 13*e* connected to the second portion 12. In addition, the third portion 13 includes a first tapered portion 13A having a groove width that decreases from the inner end 13*i* toward the second portion 12, and an equal width portion 13B extending with a constant groove width. In the present embodiment, the third portion 13 also includes a second tapered portion 13C having a groove width that decreases from the outer end 13*e* toward the first portion 11. The equal width portion 13B includes not only a mode in which the groove width is uniform along the longitudinal direction but also a mode in which the difference between the maximum groove width and the minimum groove width is not greater than 2 mm. The difference between the maximum groove width and the minimum groove width of the equal width portion 13B is preferably not greater than 1 mm. In addition, in the present embodiment, the inner end 13*i* and the outer end 13*e* are ends located on the second groove edge 20*i*.

A shortest distance Ls along a tread surface 2*a* between the inner end 13*i* and the tire equator C is preferably not less than 30% and further preferably not less than 35% of the tread ground-contact width TW (shown in FIG. 1), and is preferably not greater than 55% and further preferably not greater than 50% of the tread ground-contact width TW (shown in FIG. 1). Since the shortest distance Ls is not less than 30% of the tread ground-contact width TW, the first portion 11 can be positioned on the tire equator C side on which it is difficult to drain water, and drainage performance can be maintained at a high level. Since the shortest distance Ls is not greater than 55% of the tread ground-contact width TW, the inner end 13*i* can be located away from the outer side of the ground-contact width where slipping is likely to occur due to the difference in tread outer diameter, so that occurrence of uneven wear can be suppressed.

A length Lt in the tire axial direction of the third portion 13 is preferably not less than 5% of the tread development width Tx (shown in FIG. 1). Such a third portion 13 keeps the tread stiffness of the shoulder region Sh at a high level and exhibits excellent uneven wear resistance. In consideration of suppressing a decrease in the basic performance of the tire 1, the length Lt of the third portion 13 is further preferably not less than 10% of the tread development width Tx, and is preferably not greater than 23% and further preferably not greater than 20% of the tread development width Tx.

As for the groove width, the third portion 13 is preferably not greater than 55% and further preferably not greater than 45% of the first portion 11 and the second portion 12. Since the groove width We of the third portion 13 is not greater than 55% of a groove width Wa of the first portion 11 and a groove width Wb of the second portion 12, the tread stiffness can be increased. If, as for the groove width, the third portion 13 is excessively smaller than the first portion 11 and the second portion 12, drainage performance may deteriorate. Therefore, the groove width We of the third portion 13 is preferably not less than 15% and further preferably not less than 20% of the groove width Wa of the first portion 11 and the groove width Wb of the second portion 12. The groove width We of the third portion 13 is preferably, for example, 1.2 to 3.5 mm. The groove width Wa of the first portion 11, the groove width Wb of the second portion 12, and the groove width We of the third portion 13 are each a groove width at the midpoint in the longitudinal direction.

A groove volume V3 per unit area (not shown) on the tread surface 2*a* of the third portion 13 is preferably not less than 70% and further preferably not less than 75% of a groove volume V1 per unit area on the tread surface 2*a* of the first portion 11 and a groove volume V2 per unit area on the tread surface 2*a* of the second portion 12. Accordingly, smooth passage of water between the first portion 11 and the second portion 12 is maintained. In consideration of the viewpoint of maintaining the stiffness in the vicinity of the third portion 13 at a high level, the groove volume V3 of the third portion 13 is preferably not greater than 120% and further preferably not greater than 115% of the groove volume V1 of the first portion 11 and the groove volume V2 of the second portion 12. Each groove volume (V1, V2 and V3) per unit area is a value obtained by dividing the groove volume of each portion by the area (surface area) of each portion on the tread surface 2*a*.

Figure 6:
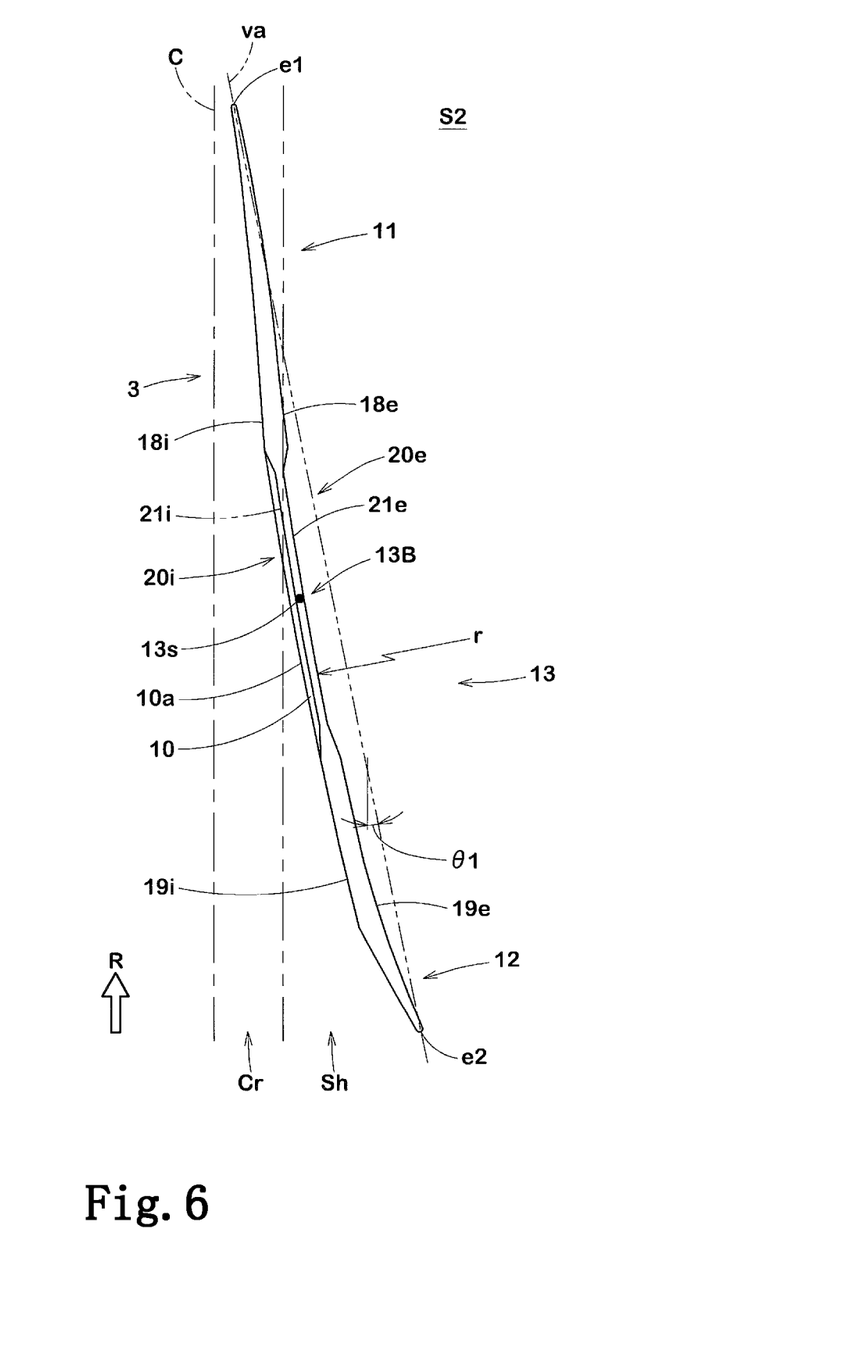
FIG. 6 is a plan view of the inclined groove of the rear wheel tire.

FIG. 6 is a plan view (tread plan view) of the inclined groove 3 of the rear wheel tire S2. As represented in FIG. 6, in the front wheel tire S1 and the rear wheel tire S2, the first groove edge 20*e* includes a first equal width edge portion 21*e* forming the equal width portion 13B. In addition, the second groove edge 20*i* includes a second equal width edge portion 21*i* forming the equal width portion 13B. Furthermore, the first portion 11 includes a first leading groove edge 18*e* located on the leading edge side in the tire rotation direction R, and a first trailing groove edge 18*i* located on the trailing edge side in the tire rotation direction R with respect to the first leading groove edge 18*e*. In addition, the second portion 12 includes a second leading groove edge 19*e* located on the leading edge side in the tire rotation direction R, and a second trailing groove edge 19*i* located on the trailing edge side in the tire rotation direction R with respect to the second leading groove edge 19*e*.

The chamfered portion 10 includes an outer edge 10*a* on the tread surface 2*a* side. In the present embodiment, the outer edge 10*a* is smoothly connected to the first trailing groove edge 18*i*. In addition, the outer edge 10*a* is smoothly connected to the second trailing groove edge 19*i*, for example. As shown in FIG. 1, in the front wheel tire S1, the outer edge 10*a* of the chamfered portion 10 is smoothly connected to the first leading groove edge 18*e* and the second leading groove edge 19*e*.

As shown in FIG. 6, in the front wheel tire S1 and the rear wheel tire S2, the third portion 13 extends in a straight manner in the present embodiment. Such a third portion 13 has low drainage resistance and serves to maintain drainage performance at a high level. In the present specification, the "straight manner" includes not only a mode in which the first equal width edge portion 21*e* and the second equal width edge portion 21*i* are formed only by straight lines, but also a mode in which, for example, the edge portions 21*e* and 21*i* are each formed by an arc having a radius of curvature r exceeding 200 mm. The third portion 13 may, for example, extend in a curved manner in which the edge portions 21*e* and 21*i* are each formed by an arc having a radius of curvature r of 20 to 200 mm.

In the present embodiment, the third portion 13 extends in the crown region Cr and the shoulder region Sh. A midpoint 13*s* of the third portion 13 is located in the shoulder region Sh. The shoulder region Sh is a region that has a smaller tire circumferential length than the crown region Cr and in which slipping is likely to occur. Therefore, slipping in the shoulder region Sh is suppressed, and the difference in the amount of wear between the shoulder region Sh and the crown region Cr becomes smaller, so that occurrence of uneven wear is suppressed.

An angle θ1 of the inclined groove 3 with respect to the tire circumferential direction is preferably not less than 5 degrees and further preferably not less than 7 degrees, and is preferably not greater than 15 degrees and further preferably not greater than 13 degrees. The angle θ1 of the inclined groove 3 is specified by a virtual line va connecting both ends e1 and e2 in the tire circumferential direction of the inclined groove 3.

Figure 7:
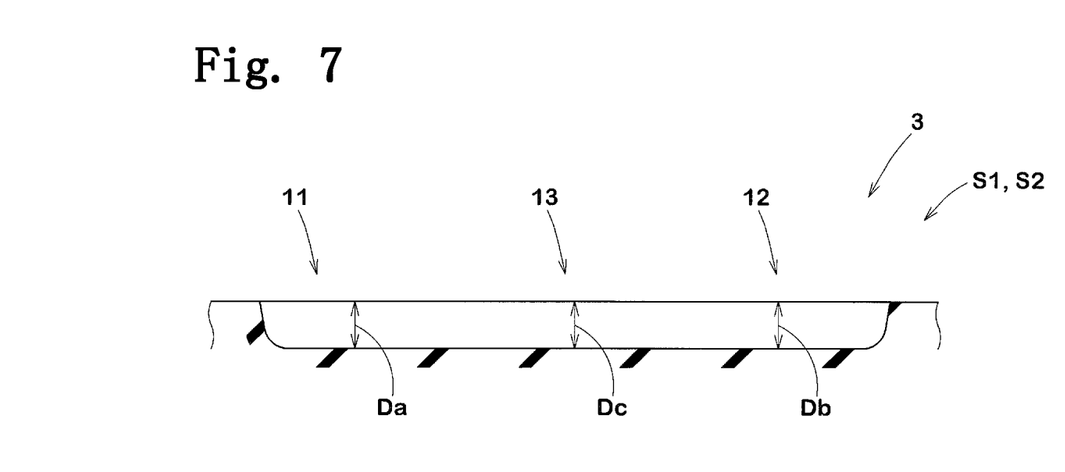
FIG. 7 is a cross-sectional view taken along a line D-D in FIG. 2.

FIG. 7 is a cross-sectional view taken along a line D-D in FIG. 2. As shown in FIG. 7, as for the groove depth, the third portion 13 is preferably not less than 70% and further preferably not less than 75% of the first portion 11 and the second portion 12, and is preferably not greater than 120% and further preferably not greater than 115% of the first portion 11 and the second portion 12. Since the groove depth Dc of the third portion 13 is not less than 70% and not greater than 120% of a groove depth Da of the first portion 11 and a groove depth db of the second portion 12, a change in the stiffness in the vicinity of the first portion 11, the second portion 12, and the third portion 13 can be reduced. Therefore, occurrence of uneven wear is suppressed, and appearance is improved. The groove depth Da of the first portion 11 and the groove depth db of the second portion 12 are preferably, for example, 3.5 to 9.5 mm. Such a groove depth of the inclined groove 3 is applied to each of the front wheel tire S1 and the rear wheel tire S2.

As shown in FIG. 1 and FIG. 2, each of the tread portions 2 of the front wheel tire S1 and the rear wheel tire S2 is provided with first sub-inclined grooves 4 and second sub-inclined grooves 5 in the present embodiment. The first sub-inclined grooves 4 are, for example, located on the outer side in the tire axial direction with respect to the inclined grooves 3. The second sub-inclined grooves 5 are, for example, located on the outer side in the tire axial direction with respect to the first sub-inclined grooves 4. Each of the first sub-inclined grooves 4 and the second sub-inclined grooves 5 is not provided with a chamfered portion 10.

Figure 8:
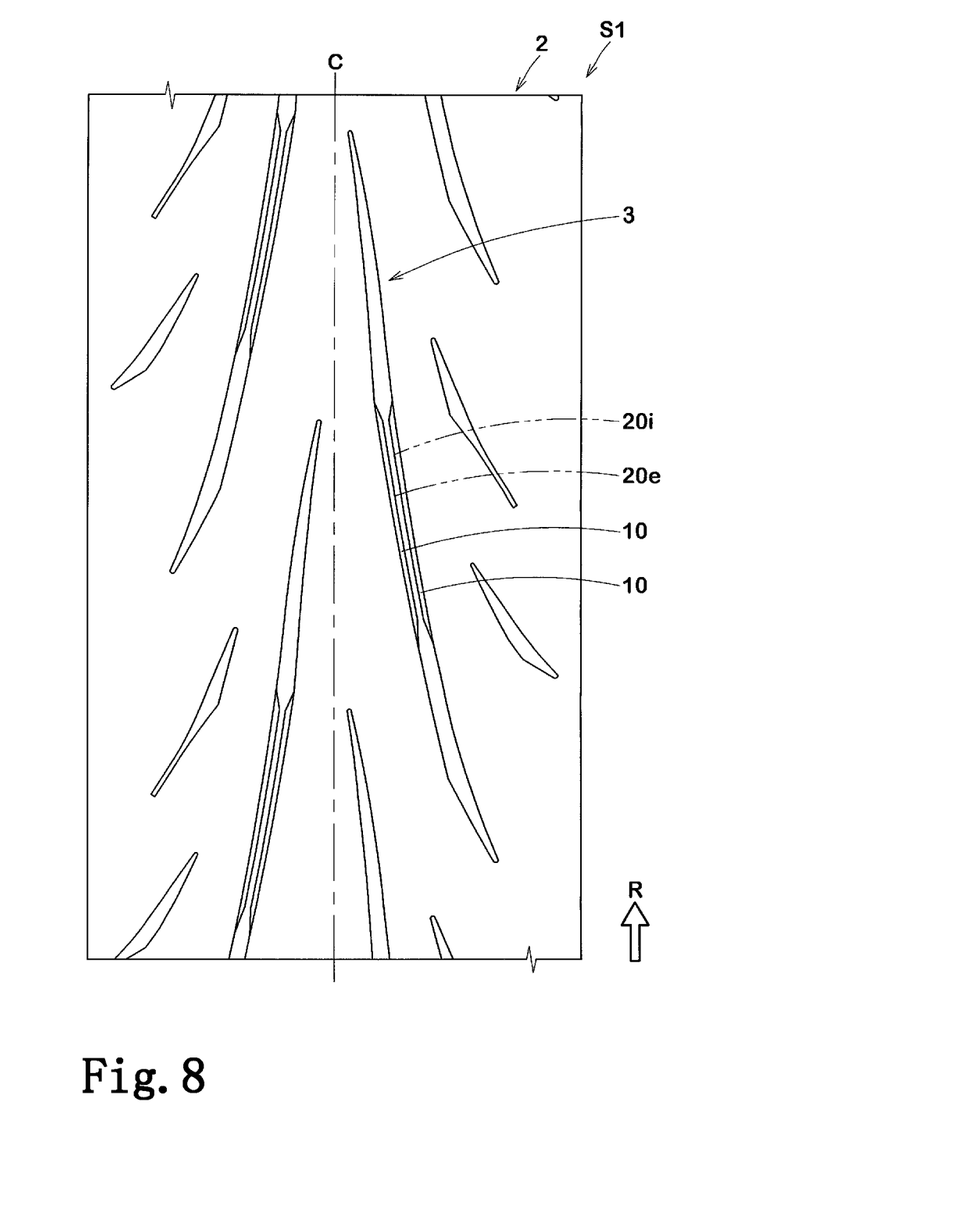
FIG. 8 is a plan view of a tread portion of a front wheel tire according to another embodiment.
Figure 9:
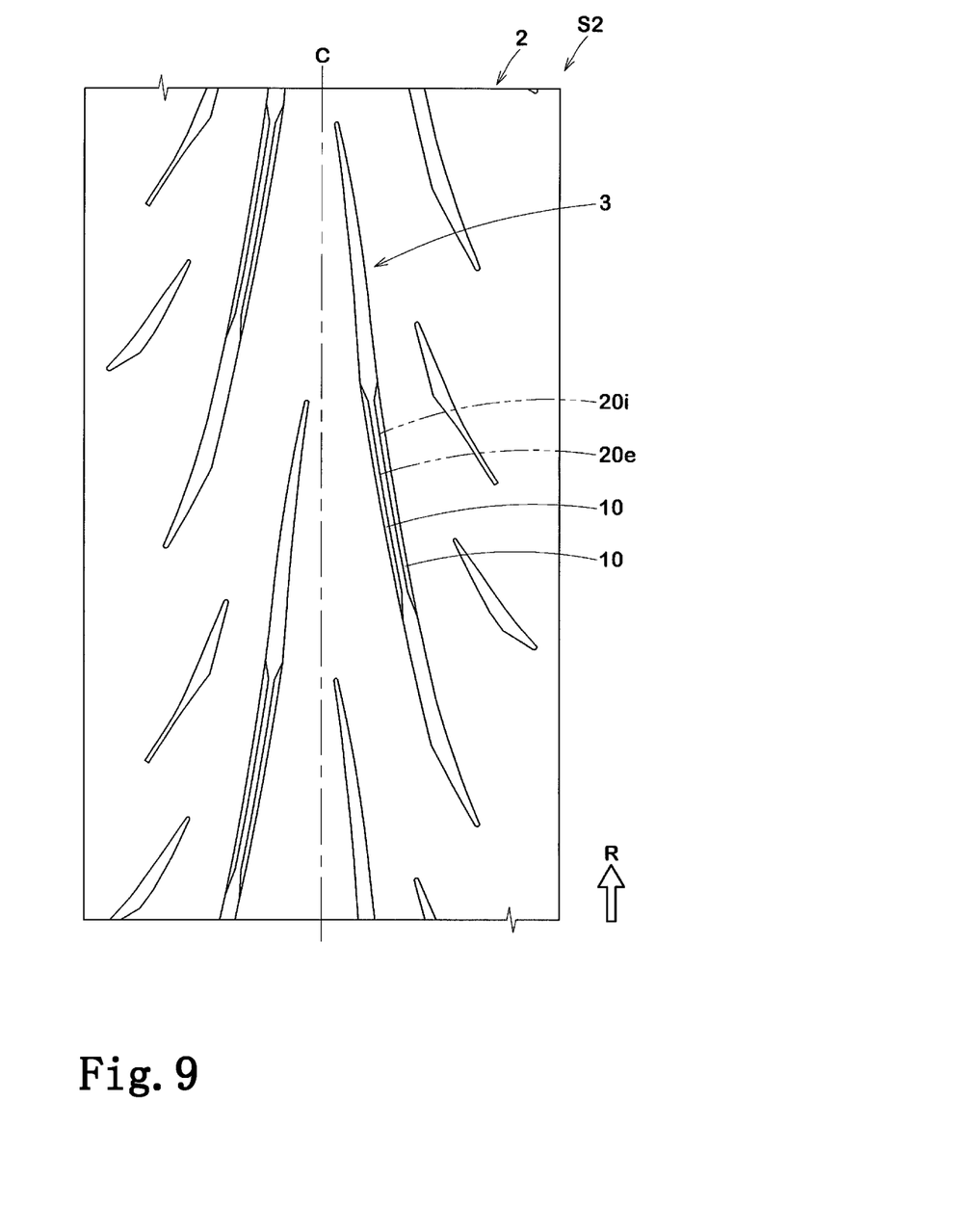
FIG. 9 is a plan view of a tread portion of a rear wheel tire according to the other embodiment.

FIG. 8 is a plan view of a tread portion 2 of a front wheel tire S1 according to another embodiment. FIG. 9 is a plan view of a tread portion 2 of a rear wheel tire S2 according to the other embodiment. As shown in FIG. 8, in this embodiment, each of the first groove edge 20e and the second groove edge 20i of the front wheel tire S1 is provided with a chamfered portion 10. As shown in FIG. 9, in this embodiment, each of the first groove edge 20e and the second groove edge 20i of the rear wheel tire S2 is provided with a chamfered portion 10. In such an embodiment as well, appearance can be improved.

Figure 10:
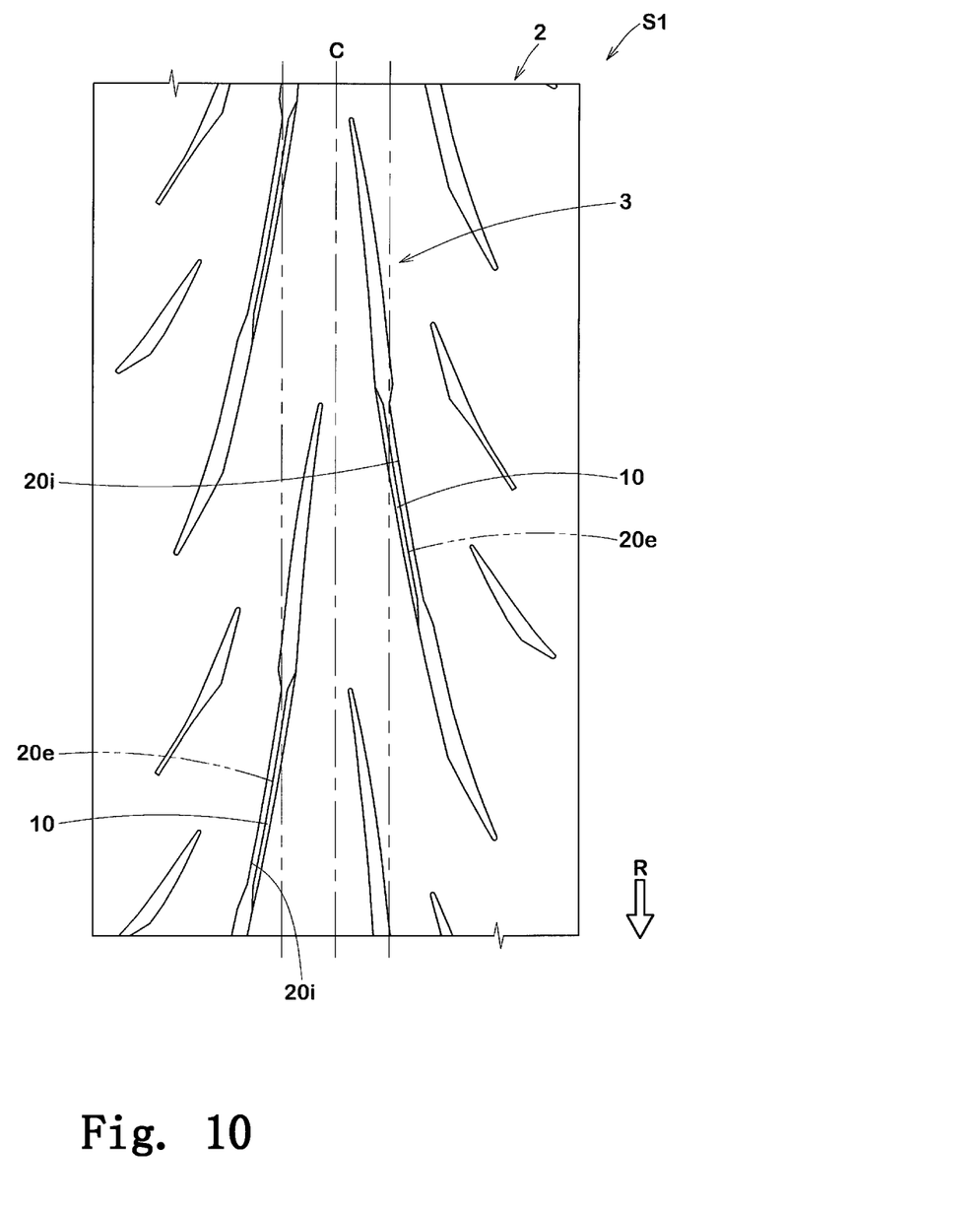
FIG. 10 is a plan view of a tread portion of a front wheel tire according to still another embodiment.

FIG. 10 is a plan view of a tread portion 2 of a front wheel tire S1 according to still another embodiment. In this embodiment as well, in the front wheel tire S1, the first groove edge 20e is provided with a chamfered portion 10. In this embodiment, the second groove edge 20i is not provided with a chamfered portion 10. The second groove edge 20i may be provided with a chamfered portion 10 (not shown).

Figure 11:
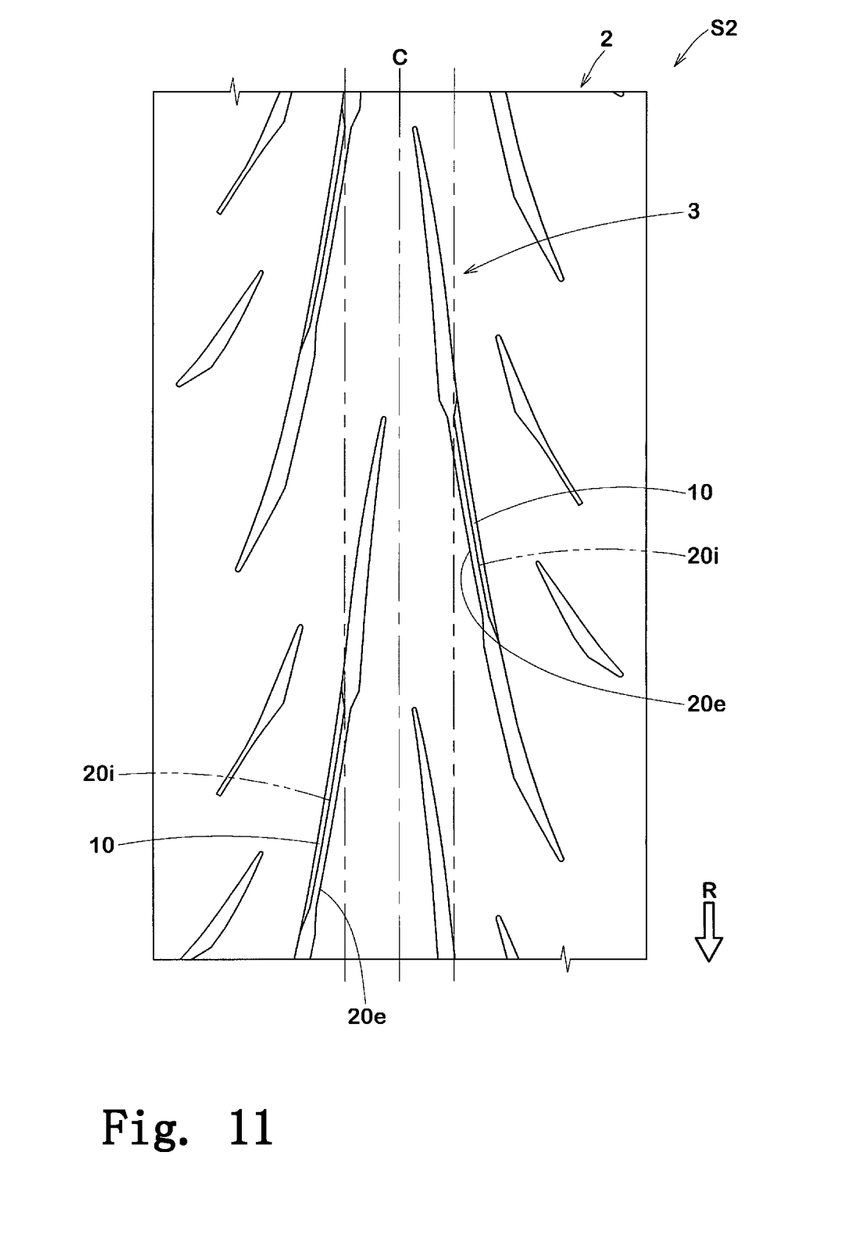
FIG. 11 is a plan view of a tread portion of a rear wheel tire according to still another embodiment.

FIG. 11 is a plan view of a tread portion 2 of a rear wheel tire S2 according to still another embodiment. In this embodiment as well, in the rear wheel tire S2, the second groove edge 20i is provided with a chamfered portion 10. In addition, in this embodiment, the first groove edge 20e is not provided with a chamfered portion 10. The first groove edge 20e may be provided with a chamfered portion 10 (not shown).

Although the motorcycle tire set according to the embodiments of the present invention has been described in detail above, the present invention is not limited to the above specific embodiments, and various modifications can be made to implement the present invention.

Examples

Motorcycle tire sets having the basic pattern in FIG. 1 or FIG. 2 were produced as test motorcycle tire sets, and were tested for appearance. The common specifications and the test method for the respective test tires are as follows.

<Appearance>

Each test motorcycle tire set was mounted on a motorcycle. A test rider rode the motorcycle on a dry asphalt circuit course. After the ride, the test rider made sensory evaluation for unnoticeability of wear in the vicinity of the third portions of the inclined grooves of the rear wheel tire. The test results are indicated as scores with the unnoticeability of wear of Comparative Example 1 being regarded as 100. The higher the value is, the better the appearance is.

Tire size: 120/70ZR17 (front wheel), 200/55ZR17 (rear wheel)
Rim size: MT3.50×17 (front wheel), MT6.00×17 (rear wheel)
Internal pressure: 250 kPa (front wheel), 290 kPa (rear wheel)
Engine displacement: 1000 cc
Riding distance: 200 km
Average speed: 120 km/h The test results are shown in Table 1.

TABLE 1

| | Comparative Example 1 | Example 1 | Example 2 |
|---|---|---|---|
| Wd (mm) | 1.5 | 1.5 | 1.5 |
| Groove edge provided with chamfered portion | Only first groove edge | Only second groove edge | Pair of groove edges |
| Appearance [Score: higher value is better] | 100 | 110 | 108 |

As a result of the test, it is confirmed that as for the rear wheel tire, the tire of each Example has improved appearance (initial period of wear) as compared to the tire of Comparative Example 1. In addition, the same results were obtained for the front wheel tire.

[Additional Notes]

The present invention includes the following aspects.

[Present Invention 1]

A motorcycle tire set including a front wheel tire and a rear wheel tire, wherein
each of the front wheel tire and the rear wheel tire includes a tread portion having a designated tire rotation direction,
each of the tread portions of the front wheel tire and the rear wheel tire has a plurality of inclined grooves provided so as to be inclined with respect to a tire circumferential direction,
each of the plurality of inclined grooves includes a first portion extending in a crown region, a second portion extending in a shoulder region, and a third portion connecting the first portion and the second portion,
the third portion has a smaller groove width than the first portion and the second portion,
the first portion, the second portion, and the third portion are inclined in the same direction with respect to the tire circumferential direction,
the third portion includes a pair of groove edges, the pair of groove edges include a first groove edge
located on a leading edge side in the tire rotation
direction, and a second groove edge located on a
trailing edge side in the tire rotation direction,
the first groove edge of the front wheel tire is provided
with a chamfered portion, and
the second groove edge of the rear wheel tire is provided
with a chamfered portion.

[Present Invention 2]

The motorcycle tire set according to Present Invention 1, wherein the second groove edge of the front wheel tire is provided with a chamfered portion.

[Present Invention 3]

The motorcycle tire set according to Present Invention 1 or 2, wherein the first groove edge of the rear wheel tire is provided with a chamfered portion.

[Present Invention 4]

The motorcycle tire set according to any one of Present Inventions 1 to 3, wherein
the third portion includes an inner end connected to the first portion, and
a shortest distance along a tread surface between the inner end and a tire equator is 30% to 55% of a tread ground-contact width.

[Present Invention 5]

The motorcycle tire set according to any one of Present Inventions 1 to 4, wherein, in a tread plan view in which the tread portion is developed in a flat surface, the third portion extends in a straight manner.

[Present Invention 6]

The motorcycle tire set according to any one of Present Inventions 1 to 4, wherein, in a tread plan view in which the tread portion is developed in a flat surface, the third portion extends in a curved manner.

[Present Invention 7]

The motorcycle tire set according to any one of Present Inventions 1 to 6, wherein, as for a groove depth, the third portion is 70% to 120% of the first portion and the second portion.

[Present Invention 8]

The motorcycle tire set according to any one of Present Inventions 1 to 7, wherein, as for a groove width, the third portion is not greater than 60% of the first portion and the second portion.

[Present Invention 9]

The motorcycle tire set according to any one of Present Inventions 1 to 8, wherein a length in a tire axial direction of the third portion is not less than 5% of a tread development width.

[Present Invention 10]

The motorcycle tire set according to any one of Present Inventions 1 to 9, wherein a groove volume per unit area on the tread surface of the third portion is not less than 70% of a groove volume per unit area on the tread surface of the first portion and a groove volume per unit area on the tread surface of the second portion.

What is claimed is:

1. A motorcycle tire set comprising a front wheel tire and a rear wheel tire, wherein
each of the front wheel tire and the rear wheel tire includes a tread portion having a designated tire rotation direction,
each of the tread portions of the front wheel tire and the rear wheel tire has a plurality of inclined grooves provided so as to be inclined with respect to a tire circumferential direction,
each of the plurality of inclined grooves includes a first portion extending in a crown region, a second portion extending in a shoulder region, and a third portion connecting the first portion and the second portion,
the third portion has a smaller groove width than the first portion and the second portion, the first portion, the second portion, and the third portion are inclined in the same direction with respect to the tire circumferential direction,
the third portion includes a pair of groove edges,
the pair of groove edges include a first groove edge located on a leading edge side in the tire rotation direction, and a second groove edge located on a trailing edge side in the tire rotation direction,
only the first groove edge of the front wheel tire is provided with a chamfered portion,
only the second groove edge of the rear wheel tire is provided with a chamfered portion,
a sum of a width of the chamfered portion and a groove width of the third portion, at a tread surface of the front tire, is greater than the groove width of only the third portion at any position of the third portion in the radial direction of the front tire, and
the chamfered portion on the first groove edge of the front wheel tire and the chamfered portion on the second groove edge of the rear wheel tire are positioned asymmetrically with respect to each other, as well as with respect to their tire equators, to cooperatively enhance wear resistance and appearance in both the front and rear tires.

2. The motorcycle tire set according to claim 1, wherein
the third portion includes an inner end connected to the first portion, and
a shortest distance along a tread surface between the inner end and the tire equator is 30% to 55% of a tread ground-contact width.

3. The motorcycle tire set according to claim 1, wherein, in a tread plan view in which the tread portion is developed in a flat surface, the third portion extends in a straight manner.

4. The motorcycle tire set according to claim 1, wherein, in a tread plan view in which the tread portion is developed in a flat surface, the third portion extends in a curved manner.

5. The motorcycle tire set according to claim 1, wherein, as for a groove depth, the third portion is 70% to 120% of the first portion and the second portion.

6. The motorcycle tire set according to claim 1, wherein, as for a groove width, the third portion is not greater than 60% of the first portion and the second portion.

7. The motorcycle tire set according to claim 1, wherein a length in a tire axial direction of the third portion is not less than 5% of a tread development width.

8. The motorcycle tire set according to claim 1, wherein a groove volume per unit area on a tread surface of the third portion is not less than 70% of a groove volume per unit area on the tread surface of the first portion and a groove volume per unit area on the tread surface of the second portion.

9. The motorcycle tire set according to claim 1, wherein the width of the chamfered portion in the front wheel tire is not less than 40% and not greater than 90% of the groove width of the third portion, and
a width of the chamfered portion in the rear wheel tire is not less than 40% and not greater than 90% of a groove width of the third portion.

10. The motorcycle tire set according to claim 1, wherein a length of the chamfered portion in the tire radial direction in the front wheel tire is not less than 10% and not greater than 35% of a groove depth of the third portion, and
  a length of the chamfered portion in the tire radial direction in the rear wheel tire is not less than 10% and not greater than 35% of a groove depth of the third portion.

11. The motorcycle tire set according to claim 1, wherein the plurality of inclined grooves in the front wheel tire and the rear wheel tire include at least a plurality of first inclined grooves arranged between a first tread end and the tire equator, and a plurality of second inclined grooves arranged between a second tread end and the tire equator, and
  the plurality of first inclined grooves and the plurality of second inclined grooves have a line symmetrical shape with respect to the tire equator.

12. The motorcycle tire set according to claim 1, wherein each of the plurality of inclined grooves extends without crossing the tire equator.

13. The motorcycle tire set according to claim 1, wherein a shortest distance between each of the plurality of inclined grooves and the tire equator is less than 10% of a tread ground-contact width.

14. The motorcycle tire set according to claim 1, wherein the third portion extends in the crown region and the shoulder region, and a midpoint of the third portion is located in the shoulder region.

15. The motorcycle tire set according to claim 1, wherein a virtual line is formed by connecting a first end and a second end of one of the plurality of inclined grooves in the tire circumferential direction, and an angle of the one of the plurality of inclined grooves with respect to the tire circumferential direction is not less than 5 degrees.

16. The motorcycle tire set according to claim 1, wherein the third portion includes:
  an inner end connected to the first portion and an outer end connected to the second portion,
  a first tapered portion having a groove width that decreases from the inner end of the third portion as the first tapered portion extends towards the second portion,
  an equal width portion extending at a constant groove width, and
  a second tapered portion having a groove width that decreases from the outer end towards the first portion.

17. The motorcycle tire set according to claim 16, wherein a maximum groove width and a minimum groove width of the equal width portion is less than 1 mm.

* * * * *